(12) United States Patent
Sayyed et al.

(10) Patent No.: US 11,343,230 B2
(45) Date of Patent: May 24, 2022

(54) METHOD FOR CONFIGURING DEVICE RESOURCES BASED ON NETWORK IDENTIFICATION AND SYSTEM THEREFOR

(71) Applicant: DELL PRODUCTS, LP, Round Rock, TX (US)

(72) Inventors: Ibrahim Sayyed, Georgetown, TX (US); Daniel L. Hamlin, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/896,626

(22) Filed: Jun. 9, 2020

(65) Prior Publication Data
US 2021/0385193 A1    Dec. 9, 2021

(51) Int. Cl.
| | | |
|---|---|---|
| G06F 7/04 | (2006.01) | |
| H04L 29/06 | (2006.01) | |
| G06F 9/4401 | (2018.01) | |
| H04L 61/5007 | (2022.01) | |

(52) U.S. Cl.
CPC ........ *H04L 63/0236* (2013.01); *G06F 9/4416* (2013.01); *H04L 61/2007* (2013.01); *H04L 63/101* (2013.01)

(58) Field of Classification Search
CPC ........ G06F 9/4405; G06F 21/54; G06F 21/57; G06F 21/572; G06F 21/575; G06F 9/4411; G06F 9/4416; H04L 61/103; H04L 61/2015; H04W 12/02
See application file for complete search history.

(56) References Cited

U.S. PATENT DOCUMENTS

| | | | | |
|---|---|---|---|---|
| 7,302,698 B1* | 11/2007 | Proudler | ................. | G06F 21/57 713/187 |
| 8,275,895 B1* | 9/2012 | Ellis | .................... | H04L 61/2015 709/229 |
| 9,425,978 B2 | 8/2016 | Frei et al. | | |
| 10,587,533 B2 | 3/2020 | Zhao | | |
| 2005/0071619 A1* | 3/2005 | Chu | ...................... | G06F 9/4405 713/2 |
| 2005/0283606 A1* | 12/2005 | Williams | .............. | G06F 9/4416 713/166 |
| 2010/0100972 A1* | 4/2010 | Lemieux | ............... | H04W 12/02 726/34 |
| 2012/0136979 A1* | 5/2012 | Tseng | .................... | H04L 61/103 709/223 |

(Continued)

*Primary Examiner* — Dustin Nguyen
(74) *Attorney, Agent, or Firm* — Larson Newman, LLP

(57) ABSTRACT

A method for configuring resources at an information handling system may include determining, during initialization, a wide area network (WAN) Internet Protocol (IP) address associated with the information handling system, and retrieving a list of trusted IP addresses from a storage location at the information handling system. The method may further include configuring a first resource at the information handling system to operate in a first state in response to determining that the WAN IP address is included at the list of trusted IP addresses, and configuring the first resource at the information handling system to operate in a second state in response to determining that the WAN IP address is not included at the list of trusted IP addresses.

20 Claims, 3 Drawing Sheets

(56) References Cited

U.S. PATENT DOCUMENTS

| | | | |
|---|---|---|---|
| 2016/0026477 A1* | 1/2016 | Chu | G06F 9/4411 |
| | | | 713/2 |
| 2019/0114432 A1* | 4/2019 | Tang | G06F 21/575 |
| 2020/0074086 A1* | 3/2020 | Bulygin | G06F 21/54 |
| 2020/0082092 A1* | 3/2020 | Areno | G06F 21/572 |

* cited by examiner

METHOD FOR CONFIGURING DEVICE RESOURCES BASED ON NETWORK IDENTIFICATION AND SYSTEM THEREFOR

FIELD OF THE DISCLOSURE

This disclosure generally relates to information handling systems, and more particularly relates to configuring device resources based on network identification.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

A method for configuring resources at an information handling system may include determining, during initialization, a wide area network (WAN) Internet Protocol (IP) address associated with the information handling system, and retrieving a list of trusted IP addresses from a storage location at the information handling system. The method may further include configuring a first resource at the information handling system to operate in a first state in response to determining that the WAN IP address is included at the list of trusted IP addresses, and configuring the first resource at the information handling system to operate in a second state in response to determining that the WAN IP address is not included at the list of trusted IP addresses.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
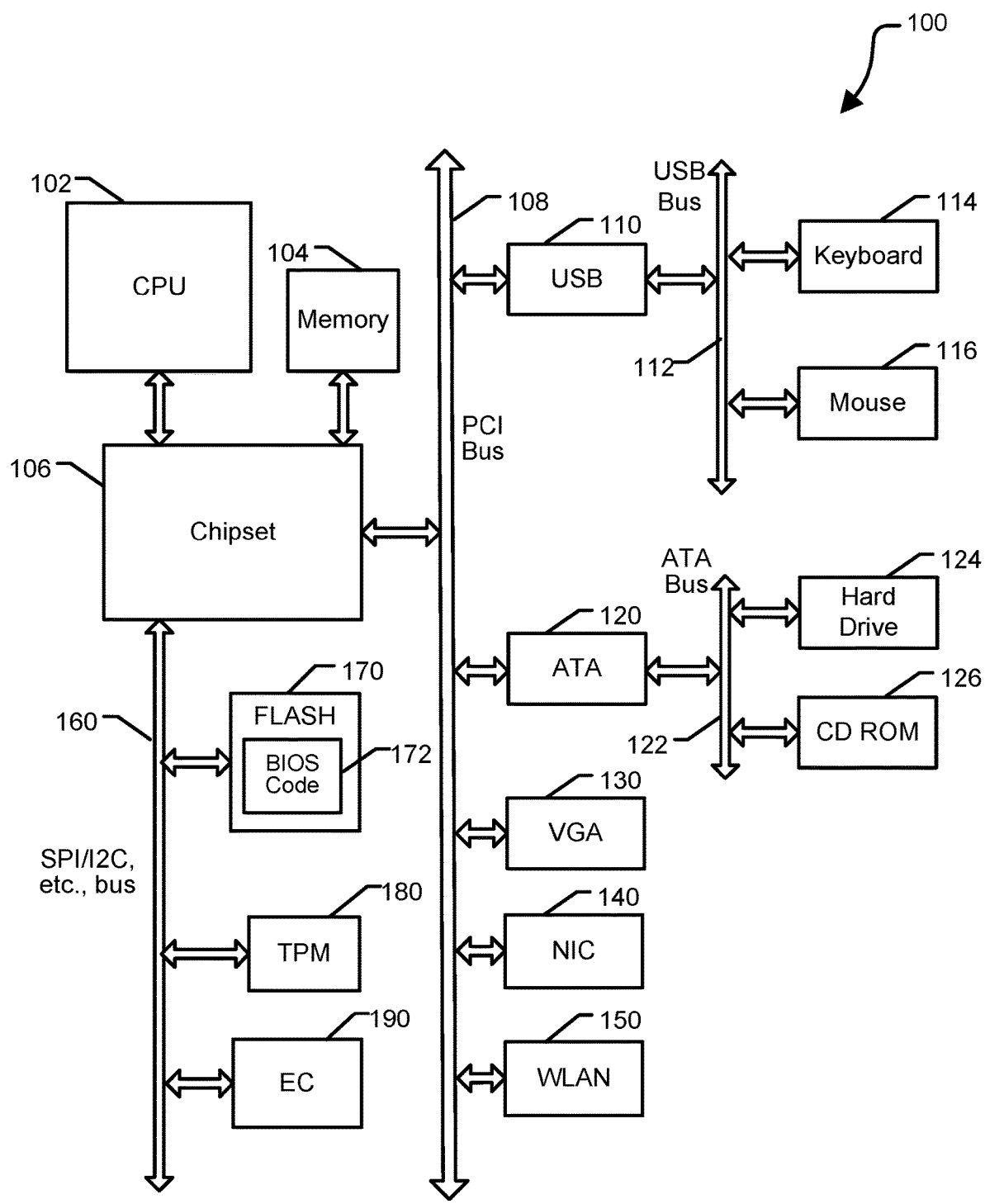
FIG. 1 is a block diagram of an information handling system according to a specific embodiment of the present disclosure.

FIG. 1 illustrates an information handling system 100 including a processor 102, a memory 104, a chipset 106, a Peripheral Component Interconnect (PCI) bus 108, a Universal Serial Bus (USB) controller 110, a USB 112, a keyboard device 114, a mouse device controller 116, an Advanced Technology Attachment (ATA) bus controller 120, an ATA bus 122, a data storage device 124, a compact disk read only memory (CD ROM) device 126, a video graphics array (VGA) device 130, a display device 131, a network interface controller (MC) 140, a wireless local area network (WLAN) controller 150, one or more serial busses 160, a non-volatile rand access memory (NVRAM) 170 for storing a basic input/output system (BIOS) 172, a Trusted Platform Module (TPM) 180, and an embedded controller (EC) 190.

NVRAM 170 can be referred to as a serial peripheral interface (SPI) flash storage device, BIOS SPI, and the like. TPM 180 is configured to ensure that the boot process starts from a trusted combination of hardware and software, and continues until the operating system has fully booted and applications are running. TPM 180 is compliant with an international standard for a secure cryptoprocessor, a dedicated microcontroller designed to secure hardware through integrated cryptographic keys. EC 190 can be referred to as a service processor, a baseboard management controller (BMC), and the like. EC 190 includes a processor that can operate out-of-band with respect to CPU 102. For example, remote management systems can utilize EC 190 to access components at information handling system independent of an operating state of CPU 102. EC 190 may be responsible for performing low level hardware tasks including thermal management and power management operations.

Information handling system 100 can include additional components and additional busses, not shown for clarity. For example, system 100 can include multiple processor cores, audio devices, and the like. While a particular arrangement of bus technologies and interconnections is illustrated for the purpose of example, one of skill will appreciate that the techniques disclosed herein are applicable to other system architectures. System 100 can include multiple CPUs and one ore more components can be integrated together. For example, portions of chipset 106 can be integrated within CPU 102. In an embodiment, chipset 106 can include a platform controller hub (PCH). System 100 can include additional buses and bus protocols. Serial bus 160 is representative of one or more busses and/or bus protocols, such as a serial peripheral interface (SPI) bus, an inter-integrated circuit protocol (I2C) bus, a system management bus (SMB), a power management bus (PMBus), and the like. Additional components of information handling system 100 can include one or more storage devices that can store machine-executable code, one or more communications ports for communicating with external devices, and various input and output (I/O) devices, such as a keyboard, a mouse, and a video display.

For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as CPU 102, a programmable logic array (PLA), an embedded device such as a System-on-a-Chip (SoC), or other control logic hardware. Information handling system 100 can also include one or more computer-readable medium for storing machine-executable code, such as software or data.

BIOS 172 includes instructions executable by CPU 102 to initialize and test the hardware components of system 100, and to load a boot loader or an operating system (OS) from a mass storage device. BIOS 172 additionally provides an abstraction layer for the hardware, that is a consistent way for application programs and OS to interact with the keyboard, display, and other input/output devices. When power is first applied to information handling system 100, the system begins a sequence of initialization procedures. During the initialization sequence, also referred to as a boot sequence, components of system 100 are configured and enabled for operation, and device drivers can be installed. Device drivers provide an interface through which other components of the system 100 can communicate with a corresponding device. In an embodiment, BIOS 172 can provide one or more runtime processes or device drivers that are configured to support functionality disclosed herein. After the initialization procedure is complete and an operating system is loaded, such as Windows, computational operation of information handling system can begin. In an embodiment, the BIOS 172 can be substantially compliant with one or more revisions of the Unified Extensible Firmware Interface (UEFI) specification.

Information handling systems, such as personal computers, smart phones, and the like are increasingly being used to provide services that require considerable security. Passwords, tokens, and other authentication techniques are commonly used to verify the user's credentials before permitting access to sensitive information. However, many of these techniques are utilized after the device is initialized, for example after an operating system is activated. Techniques disclosed herein provide additional security measures that can be enabled during initialization, prior to when the device is fully operational. In particular, various system interfaces, resources, and services can be fully or partially disabled based on how the device is connected to a communication network, such as the Internet. For example, information handling system 100 can be configured to have one set of capabilities when booting in trusted locations, while having a subset of those capabilities when booting in secondary locations.

Figure 2:
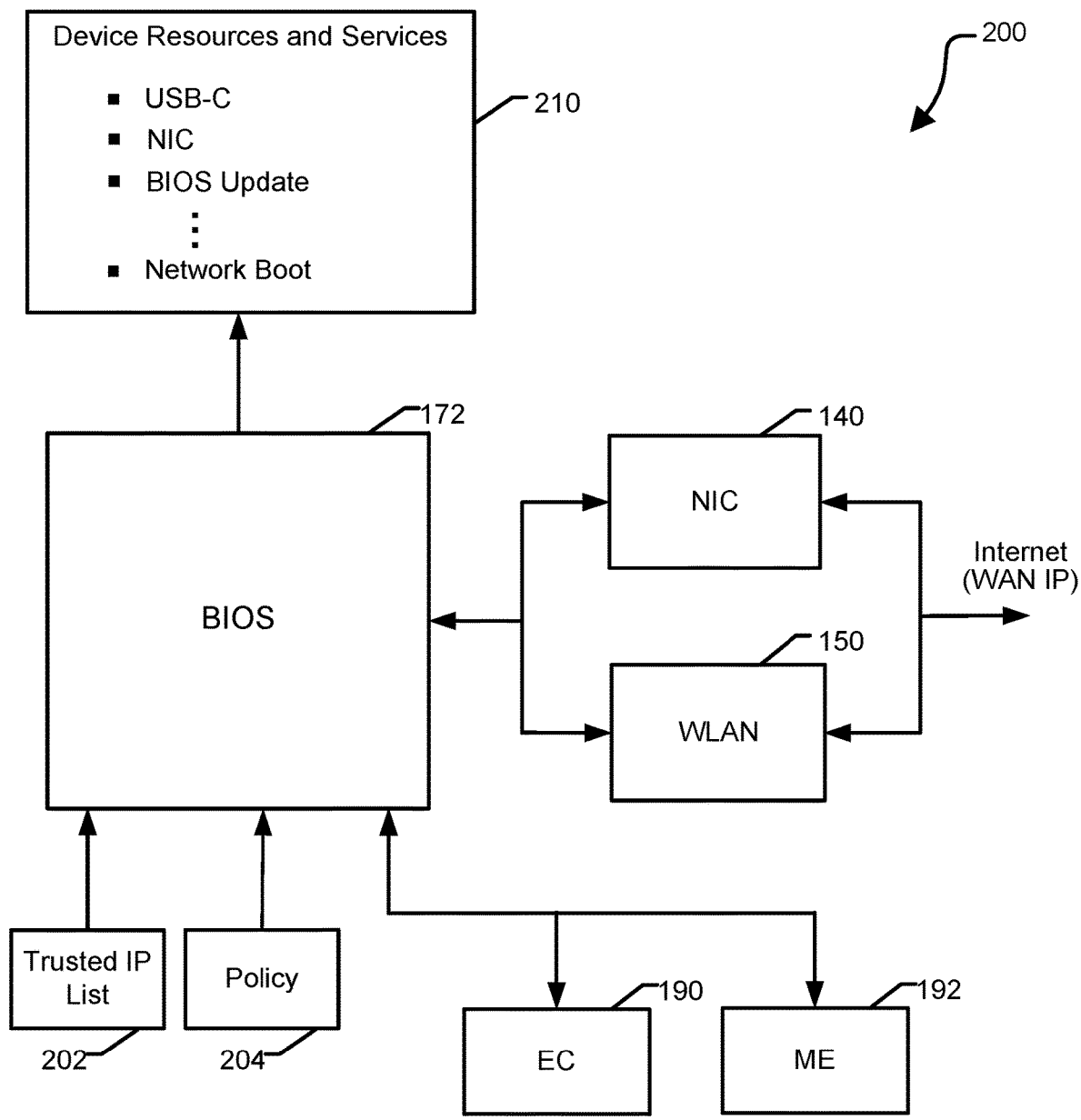
FIG. 2 is a block diagram illustrating a system for configuring device resources based on network identification according to a specific embodiment of the present disclosure.

FIG. 2 shows a system 200 for configuring device resources based on network identification according to a specific embodiment of the present disclosure. System 200 includes BIOS 172, NIC 140, WLAN 150, EC 190, an Intel Management Engine (ME) 192, a trusted IP list 202, a device interface control policy 204, and a representation of device resources and services 210. As described above, BIOS 172 is responsible for initializing information handling system 100. The initialization process is typically described as a sequence of stages, for example a Security (SEC) phase, a Pre-EFI (PEI) phase, a Driver Execution Environment (DXE) phase, a Boot Device Selection (BDS) phase, and a Transient System Load (TSL) phase. Initialization completes by handing control of the information handling system to an operating system, known as Runtime. The DXE phase is responsible for discovering and executing DXE drivers to initialize platform components. After drivers have been dispatched, control is passed to the BDS phase of execution. The BDS phase is responsible for initializing console drivers, loading device drivers, and attempting to load and execute boot selections. The BDS phase is also responsible for implementing a platform boot policy, which can be used by system vendors to customize the user experience. In an embodiment, the techniques described below can be implemented during the BDS phase.

During the BDS phase of the initialization of information handling system 100, BIOS 172 can determine network connectivity provided by network interface devices, such as NIC 140, WLAN 150, USB 110, and the like. For example, NIC 140 and WLAN 150 may connect via a wired or wireless Ethernet protocol to a broadband modem, a residential gateway, a router, and the like, which can provide an interface to a wide area network (WAN). Typically, an Internet Service Provider (ISP) provides a WAN to access the Internet. The WAN assigns an Internet Protocol (IP) address to each information handling system attached to the WAN, referred to herein as a WAN IP. For example, an information handling system at a home or office typically connects to a WAN, including the Internet, through a specific collection of network interface devices, and as such, is assigned a substantially consistent, and trusted, WAN IP. If a user connects their device to a WAN outside of the home or office, such as via a public wireless Internet service such as WiFi, the device will be recognized on the WAN by another WAN IP. In many cases, the network can be insecure. Accordingly, system 200 is configured to recognize when information handling system 100 is not connected to a trusted network and take remedial actions as defined at interface control policy 204.

During operation, and having identified a WAN IP address associated with one or more network interface controllers, BIOS 172 can determine whether the WAN IP address is included in trusted IP list 202. In an embodiment, trusted IP list 202 can be stored at a location included at NVRAM 170 known as a UEFI store, which is configured to store system variables and other data. Information stored at the UEFI store can be persistent, meaning the information is maintained while information handling system 100 is powered-off. If BIOS 172 determines that the identified WAN IP address is not included at trusted IP list 202, device interface control policy 204 can be accessed to determine how to configure selected system resources. For example, one or more system interfaces or services may be restricted or fully disabled if the identified WAN IP address is not included at trusted IP list 202. Policy 204 can be stored at NVRAM 170, EC 190, or elsewhere. Trusted IP list 202 and device interface policy 204 can be installed by a system administrator, an information technology (IT) specialist, an original equipment manufacturer (OEM), and the like.

Device resources and services 210 represents one or more components or services that are typically provided at information handling system 100. Examples of such components and service may include a USB type-C controller, a network interface controllers, BIOS update or network boot services, power controllers, data storage devices, and the like. Resources and services 210 can include any or all system features that may expose the system to unnecessary security risk. For example, a USB-C device may be configured to connect information handling system 100 to a docking station, and policy 204 can specify that such connectivity should be disabled if system 100 is not coupled to a trusted WAN IP. In an embodiment, policy 204 can specify alternative configurations for a device based on the specific WAN IP address or network connectivity information that is detected by BIOS 172, and may identify additional actions to be administered based on the identified WAN IP. For example, policy 204 can specify that BIOS 172 send messages to EC 190, ME 192, and the like, which can take further action to restrict selected services and resources. In a particular embodiment, EC 190 can disable power delivery to specific devices or subsystems.

In an embodiment, BIOS 172 can alert ME 192 that system 100 is connected to an untrusted network. ME 192 can be configured to provide various root-of-trust activities during initialization of system 100, and may continue to perform security, network transport, and other system operations during runtime. ME 192 can include access to network stack information, and thereby take part in implementation of policy 204. In still another embodiment, policy 204 can mandate that system 100 only boot to a Preboot Execution Environment (PXE), which is a client-server environment that boots a software assembly retrieved from a network. Remedial actions performed by BIOS 172 may not be visible to a user of information handling system 100. For example, BIOS 172 may initiate a network alert action with or without disrupting a user of system 100. System 200 may further be configured to adjust or override actions specified by policy 204 in response to receiving a waiver from authenticated security administrators. For example, a user may request to override actions specified by policy 204 before connecting to an untrusted network, or receive override permission from an IT service in response to a request by a user of system 100 after BIOS 172 has performed remediation specified by policy 204. In another embodiment, the policy 204 can be utilized to facilitate asset detection and recovery services in the case of theft of system 100.

Figure 3:
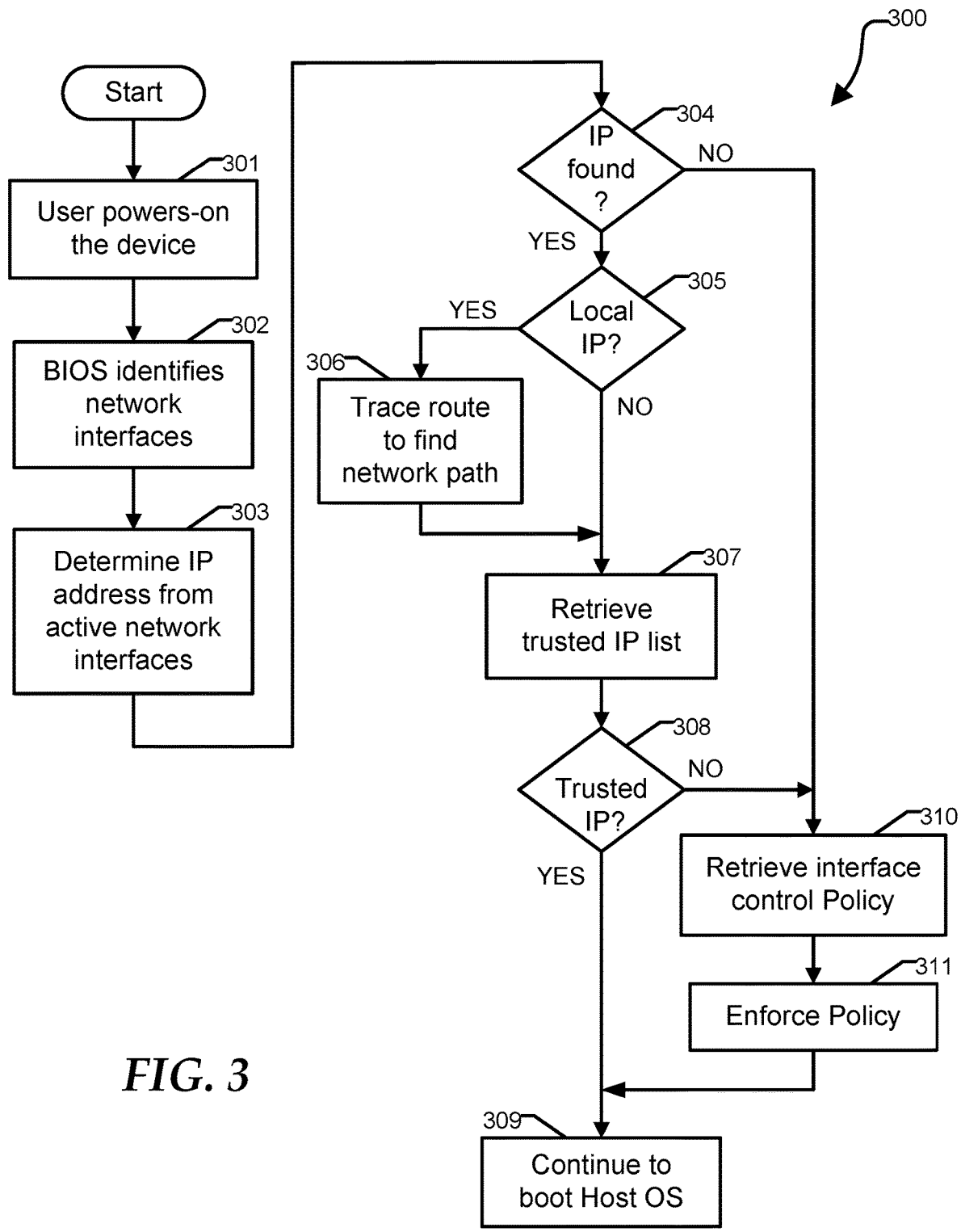
FIG. 3 is a flow diagram illustrating a method for configuring device resources based on network identification, according to a specific embodiment of the present disclosure.

FIG. 3 shows a method 300 for configuring device resources based on network identification, according to a specific embodiment of the present disclosure. Method 300 begins at block 301 where a device is turned on. For example, in response to a power-on-reset, information handling system 100 begins an initialization procedure administered by BIOS 172. At block 302, BIOS 172 identifies network interfaces available at system 100. For example, BIOS 172 can identify whether NIC 140, WLAN 150, or another device at system 100 is connected to a wide area network. At block 303, BIOS 172 can attempt to determine a WAN IP address associated with one or more active network interfaces.

Method 300 proceeds to decision block 304 where BIOS 172 determines whether a network IP address has been identified. If no IP address is found, method 300 proceeds to block 310 where an interface control policy is retrieved to identify remedial actions that should be invoked. If an IP address is identified at block 304, the method proceeds to decision block 305 where BIOS 172 can determine whether the identified IP address is a local IP address or a WAN IP address. As used herein, a local IP address typically has a value of 192.168.x.x, and is associated with a local area network. If the identified IP address is not a local IP address, method 300 proceeds to block 307 where a trusted IP list is retrieved. However, if the identified IP address is a local IP address, method 300 proceeds to block 306 where trace-route command can be used to discover how system 100 is connected to a WAN, typically the Internet. A trace-rout command is a diagnostic command that identifies a network path (route) and transit delays of data packets as they propagate across a WAN to a specified destination address. Based on the information returned by the trace-route command, BIOS 172 can determine one or more network IP addresses encountered during execution of the command. After completing the trace-route procedure, method 300 continues to block 307, where trusted IP list 202 is retrieved.

After trusted IP list 202 is retrieved, method 300 continues to decision block 308 where BIOS 172 can determine whether the IP address identified in the preceding blocks is included in trusted IP list 202, thereby determining whether system 100 is connected to a trusted network. If the identified IP address is included at list 202, method 300 proceeds to block 309 where BIOS 172 continues to initialize system 100, ultimately booting to an operating system such as Windows. Returning to decision block 308, if BIOS 172 determines that the IP address is not included at trusted IP list 202, method 300 proceeds to block 310 where interface control policy 204 is retrieved. At block 311, resources specified by policy 204 are configured as defined in the policy based on the WAN IP address identified earlier in method 300. After the policy has been enforced, method 300 proceeds to block 309 where BIOS 172 completes initialization of system 100 and transfers control to an operating system.

As described above, policy 204 can define how to configure each of one or more enumerated system resources based on determining that system 100 is not connected to a WAN using a trusted IP address identified in trusted IP list 202. Devices and services can be fully disabled or partially disabled, as specified by policy 204. For example, if information handling system 100 is booted while connected to a WAN using a trusted IP address, all or most system resources may be fully enabled. If system 100 is booted while connected to an untrusted IP address, configuration of a specified list of devices and/or services can be modified as needed to maintain security of system 100. If system 100 is booted while not connected to any network, yet another configuration of system resources can be selected. In an embodiment, policy 204 can define particular configuration settings to utilize when a specific un-trusted WAN IP address is detected. For example, policy 204 can allow system 100 to be fully functional while operating in a secure location identified by a trusted IP address included at list 202, while functionality may be limited when operating at a less secure location having another IP address specified at policy 204, such as at a user's home. Yet another level of functionality may be specified by policy 204 when system 100 is operating while not connected to any network. In an alternative embodiment, list 202 can specify un-trusted IP addresses, and policy 204 can specify how to configure resources if the detected IP address is included at list 202.

Referring back to FIG. 1, the information handling system 100 can include a set of instructions that can be executed to cause the information handling system to perform any one or more of the methods or computer based functions disclosed herein. The information handling system 100 may operate as a standalone device or may be connected to other computer systems or peripheral devices, such as by a network.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

The information handling system 100 can include a disk drive unit and may include a computer-readable medium, not shown in FIG. 1, in which one or more sets of instructions, such as software, can be embedded. Further, the instructions may embody one or more of the methods or logic as described herein. In a particular embodiment, the instructions may reside completely, or at least partially, within system memory 104 or another memory included at system 100, and/or within the processor 102 during execution by the information handling system 100. The system memory 104 and the processor 102 also may include computer-readable media. A network interface device (not shown at FIG. 1) can provide connectivity to a network, such as a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories.

Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
    initializing operation of an information handling system by executing basic input/output system (BIOS) firmware; and
    during a boot device selection (BDS) phase of the initializing operation and prior to handing control of the information handling system to an operating system:
        determining a wide area network (WAN) Internet Protocol (IP) address associated with the information handling system;
        retrieving a list of trusted IP addresses from a storage location at the information handling system in response to determining that the WAN IP address associated with the information handling system is not a local IP address;

configuring a first resource at the information handling system to operate in a first state in response to determining that the WAN IP address is included at the list of trusted IP addresses; and configuring the first resource to operate in a second state according to policy information based on the WAN IP address in response to determining that the WAN IP address is not included at the list of trusted IP addresses, the second state different than the first state.

2. The method of claim 1, wherein the policy information is stored at the information handling system, the policy information identifying a configuration of one or more resources at the information handling system in response to determining that the WAN IP address is not included at the list of trusted IP addresses.

3. The method of claim 1, wherein the first resource is a network interface controller, and wherein the first state is a fully operational configuration and the second state is a disabled configuration.

4. The method of claim 1, wherein the first resource is a universal serial bus controller, and wherein the first state is a fully operational configuration and the second state is a disabled configuration.

5. The method of claim 1, wherein the first resource is an interface to update the BIOS firmware, and wherein the interface is enabled in the first state and disabled in the second state.

6. The method of claim 1, wherein the first resource is a BIOS recovery mechanism, and wherein the BIOS recovery mechanism is enabled in the first state and disabled in the second state.

7. The method claim 1, further comprising revoking security credentials in response to determining that the WAN IP address is not included at the list of trusted IP addresses.

8. The method claim 1, further comprising retrieving an interface control policy stored at the information handling system in response to determining that the WAN IP address is not included at the list of trusted IP addresses.

9. The method of claim 1, further comprising sending a message to an Intel Management Engine, the message indicating that the WAN IP address is not included at the list of trusted IP addresses.

10. The method of claim 1, further comprising configuring the first resource to operate in the first state if the WAN IP address is not included at the list of trusted IP addresses in response to receiving override authorization from an information technology system administrator.

11. The method of claim 1, further comprising restricting boot of the information handling system to a software assembly retrieved from a Preboot Execution Environment network server in response to determining that the WAN IP address is not included at the list of trusted IP addresses.

12. The method of claim 1, further comprising blocking network boot of the information handling system in response to determining that the WAN IP address is not included at the list of trusted IP addresses.

13. The method of claim 1, further comprising notifying system administration personnel in response to determining that the WAN IP address is not included at the list of trusted IP addresses.

14. An information handling system comprising:
a basic input/output system (BIOS); and
a processor to execute instructions included at the BIOS, the instructions to:
initialize operation of the information handling system;
determine a wide area network (WAN) Internet Protocol (IP) address associated with the information handling system;
retrieve a list of trusted IP addresses from a storage location at the information handling system in response to determining that the WAN IP address associated with the information handling system is not a local IP address;
configure a first resource at the information handling system to operate in a first state in response to determining that the WAN IP address is included at the list of trusted IP addresses; and
configure the first resource to operate in a second state according to policy information based on the WAN IP address in response to determining that the WAN IP address is not included at the list of trusted IP addresses, the second state being different than the first state.

15. The information handling system of claim 14, wherein the policy information stored at the information handling system, the policy information identifying a configuration of one or more resources at the information handling system in response to determining that the WAN IP address is not included at the list of trusted IP addresses.

16. The information handling system of claim 14, wherein the first resource is a network interface controller, and wherein the first state is a fully operational configuration and the second state is a disabled configuration.

17. The information handling system of claim 14, wherein the first resource is an interface to update a BIOS firmware, and wherein the interface is enabled in the first state and disabled in the second state.

18. A method comprising:
determining, during a boot device selection (BDS) phase of an initialization operation of an information handling system, a wide area network (WAN) Internet Protocol (IP) address associated with a network interface controller at the information handling system;
retrieving a list of trusted IP addresses from a storage location at the information handling system, in response to determining that the WAN IP address associated with the information handling system is not a local IP address;
enabling operation of a first resource of the information handling system in response to determining that the WAN IP address is included at the list of trusted IP addresses; and
disabling operation of the first resource according to policy information based on the WAN IP address in response to determining that the WAN IP address is not included at the list of trusted IP addresses.

19. The method of claim 18, wherein the first resource is identified by an interface control policy stored at the information handling system.

20. The method of claim 18, wherein the first resource is the network interface controller, and wherein a first state is a fully operational configuration and a second state is a disabled configuration.

* * * * *